United States Patent [19]
Gustafsson

[11] Patent Number: 6,035,604
[45] Date of Patent: Mar. 14, 2000

[54] PACKAGING UNIT FOR CONTINUOUSLY PRODUCING SEALED PACKAGES CONTAINING POURABLE FOOD PRODUCTS, AND METHOD OF MONITORING A SEALING OPERATION PERFORMED ON THE PACKAGING UNIT

[75] Inventor: Per Gustafsson, Bjarred, Sweden

[73] Assignee: Tetra Laval Holdings & Finance S.A., Pully, Switzerland

[21] Appl. No.: 09/094,695

[22] Filed: Jun. 15, 1998

[30] Foreign Application Priority Data

Jun. 27, 1997 [EP] European Pat. Off. .............. 97830320

[51] Int. Cl.[7] .............................. B65B 9/06; B65B 57/04
[52] U.S. Cl. ..................................... 53/64; 53/75; 53/552
[58] Field of Search .............................. 53/551, 552, 451, 53/75, 64

[56] References Cited

U.S. PATENT DOCUMENTS

| | | |
|---|---|---|
| 2,738,631 | 3/1956 | Järund . |
| 2,741,079 | 4/1956 | Rausing . |
| 2,784,540 | 3/1957 | Järund . |
| 3,300,944 | 1/1967 | Thesing . |
| 3,320,718 | 5/1967 | Thesing . |
| 3,388,525 | 6/1968 | Thesing et al. . |
| 3,444,792 | 5/1969 | Thesing et al. . |
| 3,555,652 | 1/1971 | Ignell . |
| 3,925,139 | 12/1975 | Simmons ..................................... 53/75 |
| 4,074,961 | 2/1978 | Reil . |
| 4,387,547 | 6/1983 | Reil . |
| 4,454,704 | 6/1984 | Ullman . |
| 4,768,327 | 9/1988 | Mosher ....................................... 53/75 |
| 4,825,625 | 5/1989 | Hufford . |
| 5,155,980 | 10/1992 | Mansson et al. . |
| 5,551,206 | 9/1996 | Fukuda ....................................... 53/75 |
| 5,715,645 | 2/1998 | Fukuda ....................................... 53/551 |

FOREIGN PATENT DOCUMENTS

2250500 6/1992 United Kingdom .

*Primary Examiner*—John Sipos
*Attorney, Agent, or Firm*—Burns, Doane, Swecker & Mathis, L.L.P.

[57] ABSTRACT

A packaging unit (1) for continuously producing aseptic sealed packages (2), containing a pourable food product, from a tube (14) of packaging material filled with the food product; the unit (1) has a first and second chain conveyor (10, 11) respectively having a number of first and second jaws (12, 13) which interact with and grip the tube (14) at respective equally spaced cross sections (88) to perform, at the cross sections (88), respective sealing operations on the tube (14); and the unit (1) also has a monitoring device (91) for monitoring the sealing operations, and in turn having at least one fixed sensor (92; 93) cooperating with each second jaw (13) to generate at least one monitoring signal (S1, S2; S3, S4) related to an operating value (Vo) of a quantity associated with the second jaw (13), and a comparing circuit (99) for comparing the operating value (Vo) with at least one predetermined reference value (Vf) of the aforementioned quantity, and for generating a fault signal (S5) indicating malfunctioning of the monitored second jaw (13) in the event of a predetermined relationship between the operating value (Vo) and the reference value (Vf).

12 Claims, 7 Drawing Sheets

6,035,604

PACKAGING UNIT FOR CONTINUOUSLY PRODUCING SEALED PACKAGES CONTAINING POURABLE FOOD PRODUCTS, AND METHOD OF MONITORING A SEALING OPERATION PERFORMED ON THE PACKAGING UNIT

This application claims priorty under U.S.C §§119 and/or 365 to No. 97830320.4 filed in the EPO on Jun. 27, 1997; the entire content of which is hereby incorporated by reference.

The present invention relates to a packaging unit for continuously producing aseptic sealed packages, containing pourable food products, from a continuous tube of packaging material.

Many pourable food products, such as fruit juice, pasteurized or UHT (ultra-high-temperature treated) milk, wine, tomato sauce, etc., are sold in packages made of sterilized packaging material.

A typical example of such a package is the parallelepiped packaging container for liquid or pourable food products known by the name of Tetra Brik Aseptic (registered trademark), which is formed by folding and sealing a strip-rolled packaging material. The rolled packaging material comprises layers of fibrous material, e.g. paper, covered on both sides with thermoplastic material, e.g. polyethylene; and the side of the packaging material eventually contacting the food product in the package also comprises a layer of barrier material, e.g. an aluminium sheet, in turn covered with a layer of thermoplastic material.

As is known, packages of the above type are produced on fully automatic packaging units, on which a continuous tube is formed from the packaging material supplied in strip form. The strip of packaging material is sterilized on the packaging unit, e.g. by applying a chemical sterilizing agent, such as a hydrogen peroxide solution; following sterilization, the sterilizing agent is removed, e.g. vaporized by heating, from the surfaces of the packaging material; and the strip of packaging material so sterilized is kept in a closed sterile environment, and is folded and sealed longitudinally to form a tube.

The tube is filled with the sterilized or sterile-processed food product, and is sealed at equally spaced cross sections at which it is then cut into pillow-shaped packages, which are subsequently folded mechanically to form final, e.g. parallelepiped, packages.

Continuous packaging units of the above type are known (as illustrated, for example, in U.S. Pat. No. 33,467) which comprise two chain conveyors defining respective endless paths and fitted with respective numbers of jaws. The two paths comprise respective branches substantially facing and parallel to each other, and between which the tube of packaging material is fed; and the jaws on one conveyor cooperate, along said branches of the respective paths, with corresponding jaws on the other conveyor to grip the tube at a number of successive cross sections and perform respective sealing operations on the packages.

On units of the above type, the sealing pressure and, in particular, control of the sealing pressure are obviously of vital importance in ensuring the production of perfectly integral packages, and in preserving the aseptic characteristics of the contents.

Consequently, a strong demand exists for some way of so monitoring the sealing operations as to determine the quality of the seal and, more importantly, determine, in the course of the production process, any departure from the established standard quality level requiring corrective measures.

One proposal already made, that of monitoring the pressure to which the tube of packaging material is subjected during sealing, has, to the Applicant's knowledge, failed as yet to be implemented satisfactorily.

One of the solutions proposed, that of fitting a sensor to each jaw on at least one of the two conveyors, requires the use of an inordinate number of sensors generating a large number of monitoring signals for processing, and is also difficult to implement by requiring the transfer to a processing unit of monitoring signals emitted by sensors fitted to moving jaws.

It is an object of the present invention to provide a packaging unit for continuously producing sealed packages containing pourable food products, and which is equipped with a reliable, structurally simple device for monitoring the sealing operations.

According to the present invention, there is provided a packaging unit for continuously producing sealed packages, containing a pourable food product, from a tube made of heat-seal packaging material in sheet form, fed along a vertical supply path, and filled with said food product; said unit comprising:

a first chain conveyor having a plurality of first jaws, and defining a first endless path of said first jaws;

a second chain conveyor having a plurality of second jaws, and defining a second endless path of said second jaws;

said first and said second path respectively comprising a first and a second work portion adjacent to said supply path of the tube of packaging material, and extending substantially symmetrically on opposite sides of said supply path, so that said first jaws are maintained contacting respective said second jaws to grip said tube at respective equally spaced cross sections, and to perform, at said cross sections, respective sealing operations on the tube by heat-sealing the packaging material;

characterized by comprising monitoring means for monitoring at least said second jaws along said second work portion of said second path, to determine correct performance of said sealing operations; said monitoring means comprising fixed sensor means located at said second work portion and cooperating with each said second jaw to generate at least one monitoring signal related to an operating value of a quantity associated with said second jaw, and comparing means for comparing said operating value with at least one predetermined reference value of said quantity, and for generating a fault signal in the event of a predetermined relationship between said operating value and said reference value.

The present invention also relates to a method of monitoring a sealing operation on a packaging unit for continuously producing sealed packages, containing a pourable food product, from a tube of packaging material fed along a vertical supply path and filled with said food product; said unit comprising:

a first chain conveyor having a plurality of first jaws, and defining a first endless path of said first jaws;

a second chain conveyor having a plurality of second jaws, and defining a second endless path of said second jaws;

said first and said second path respectively comprising a first and a second work portion adjacent to said supply path of the tube of packaging material, and extending substantially symmetrically on opposite sides of said supply path, so that said first jaws are maintained contacting respective said second jaws to grip said tube at respective equally spaced cross sections, and to perform, at said cross sections, respective said sealing operations on the tube by heat-sealing the packaging material;

said method being characterized by comprising the steps of:

generating, by means of fixed sensor means located at said second work portion, at least a first monitoring signal relative to each said second jaw and related to an operating value of a quantity associated with the second jaw;

comparing said operating value with at least one predetermined reference value of said quantity; and generating a fault signal in the event of a predetermined relationship between said operating value and said reference value.

A preferred, non-limiting embodiment of the present invention will be described by way of example with reference to the accompanying drawings, in which.

Figure 1:
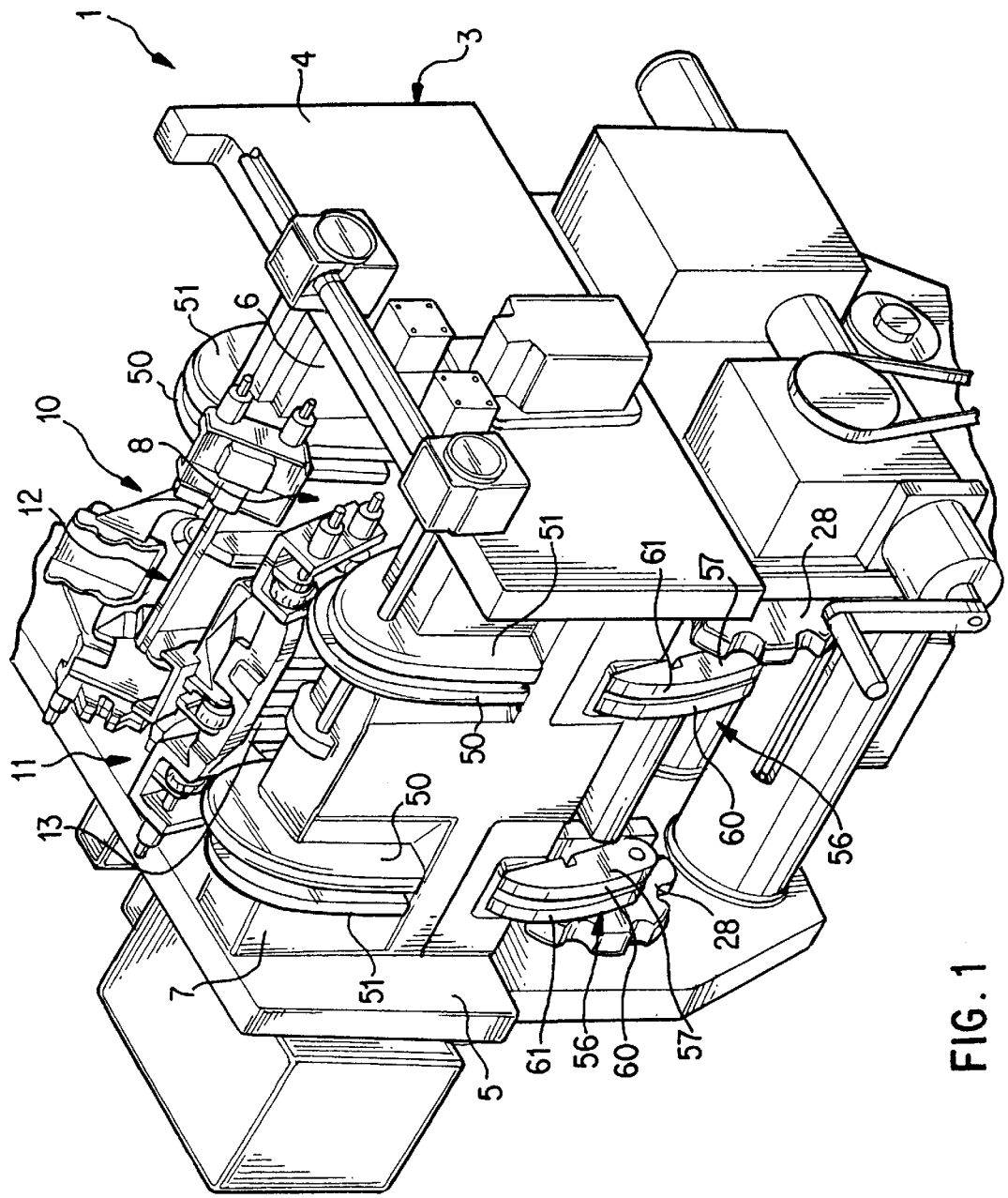
FIG. 1 shows a view in perspective, with parts removed for clarity, of a packaging unit in accordance with the present invention.

With reference to FIGS. 1, 2, 8 and 9, number 1 indicates a packaging unit for continuously producing, from a tube 14 of packaging material, sealed packages 2 containing a pourable food product, such as pasteurized or UHT milk, fruit juice, wine, etc.

Tube 14 is formed in known manner upstream from unit 1 by longitudinally folding and sealing a strip of heat-seal material, and is filled upstream with the sterilized or sterile-processed food product for packaging. Unit 1 comprises a frame 3 (FIGS. 1, 8 and 9)) defined by two side walls 4, 5 and by two parallel transverse walls 6, 7 fitted rigidly between side walls 4, 5 and defining, with side walls 4, 5, an opening 8; and two chain conveyors 10, 11 fitted to frame 3 and respectively comprising first jaws or more simply jaws 12 (only one shown in FIG. 1) and second jaws or more simply counter-jaws 13 (only one shown in FIG. 1) cooperating with each other to interact with the tube 14 of packaging material fed along a vertical path A through opening 8.

Conveyors 10 and 11 define respective endless paths P and Q along which jaws 12 and counter-jaws 13 are fed, and which respectively extend about walls 6 and 7 of frame 3.

Conveyor 10 comprises an articulated chain 15 extending along path P; and two drive wheels 16 meshing with and on both sides of chain 15 at the bottom end of path P. Jaws 12 are an integral part of and define alternate links of chain 15, and are connected to one another in articulated manner by pairs of links 17.

More specifically, each jaw 12 (FIG. 3) comprises an elongated main body 20 extending in a direction perpendicular to path A and parallel to wall 6, and having respective end projections 21 and 22, each of which has a projecting first and second pin 23, 24 spaced with respect to each other and having respective axes 25, 26 parallel to the main dimension of body 20. Links 17 pivot on pins 23, 24 of jaws 12 so as to connect pins 23 of one jaw 12 to pins 24 of the adjacent jaw.

Similarly, conveyor 11 comprises an articulated chain 27 extending along path Q; and two drive wheels 28 meshing with chain 27 at the bottom end of path Q. Chain 27 is defined by a number of counter-jaws 13 connected in articulated manner to one another and only described in detail insofar as they differ from jaws 12, and using the same numbering system for any parts similar or corresponding to those described in connection with jaws 12. Briefly, each counter-jaw 13 comprises a main body 20 having pairs of end pins 23, 24 about which links 17 pivot to connect adjacent pairs of counter-jaws 13.

Each jaw 12 comprises an induction heating element 29 fitted to main body 20 in a direction crosswise to path A of tube 14, and which in turn comprises a pair of straight, parallel active surfaces 30, and is supplied electrically by a pair of contact brushes 34 cooperating in sliding manner, in use, with a supply bar (not shown) fitted to frame 3 and extending in the region of path P inside opening 8.

Figure 4:
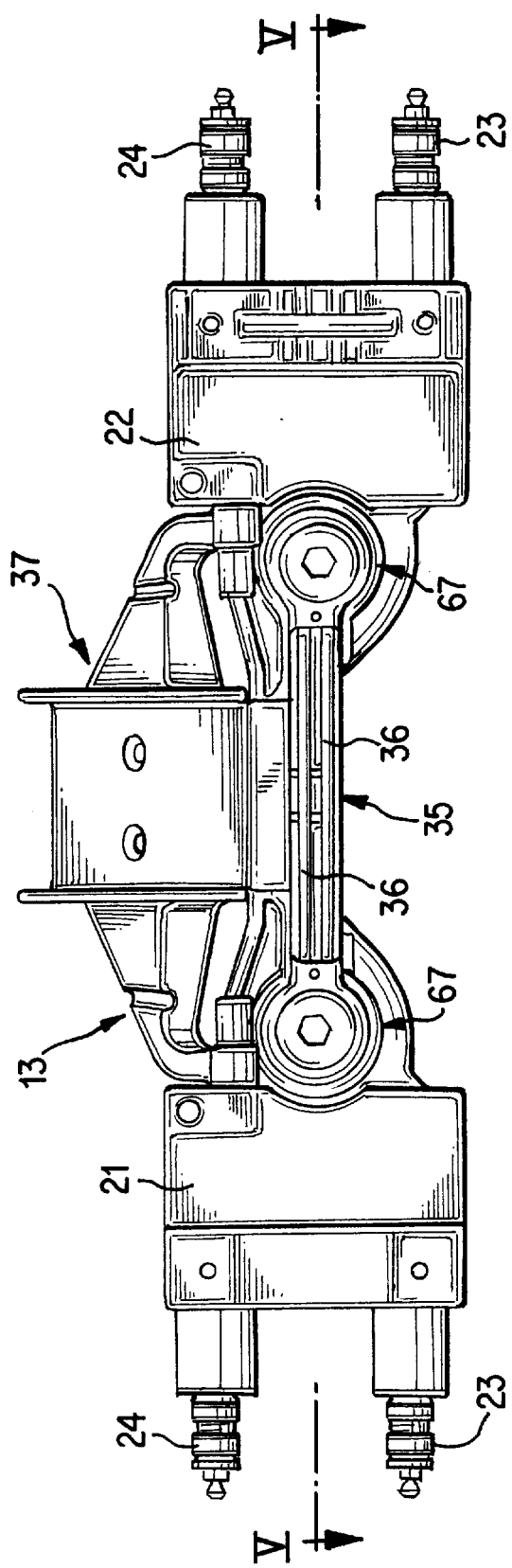
FIG. 4 shows a front view of the FIG. 3 counter-jaw.
Figure 5:
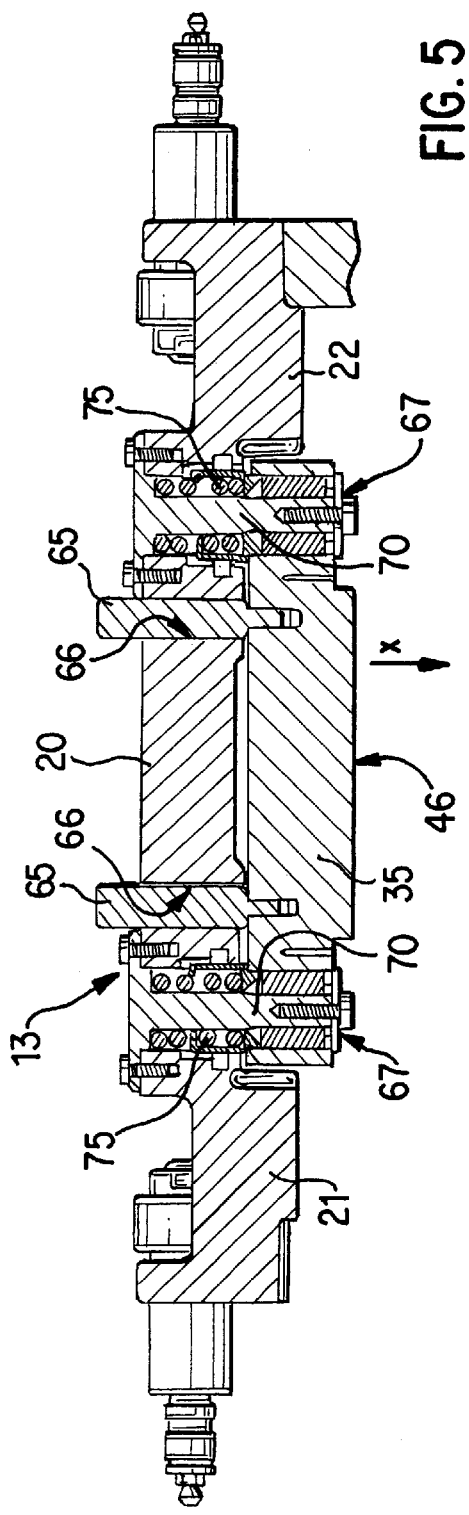
FIG. 5 shows a section along line V—V in FIG. 4.

As opposed to a heating element 29, each counter-jaw 13 (FIGS. 4 and 5) comprises a pressure bar 35, which cooperates with heating element 29 of corresponding jaw 12 to grip a cross section of tube 14 (FIG. 2) and perform a sealing operation by heat-sealing the packaging material. On a front surface 46 facing corresponding jaw 12 in use, bar 35 comprises two bands 36 of relatively flexible elastomeric material, which cooperate with the packaging material in opposition to the active surfaces 30 of heating element 29.

Jaws 12 and counter-jaws 13 each comprise a respective control device 37—not forming part of the present invention and therefore not described in detail—for controlling the volume of package 2 as it is being formed.

The movement of jaws 12 and counter-jaws 13 is controlled by respective pairs of cams 50, 51 fitted to walls 6, 7 of frame 3 and cooperating with respective pairs of rollers 52, 53 fitted to jaws 12 and counter-jaws 13.

Figure 3:
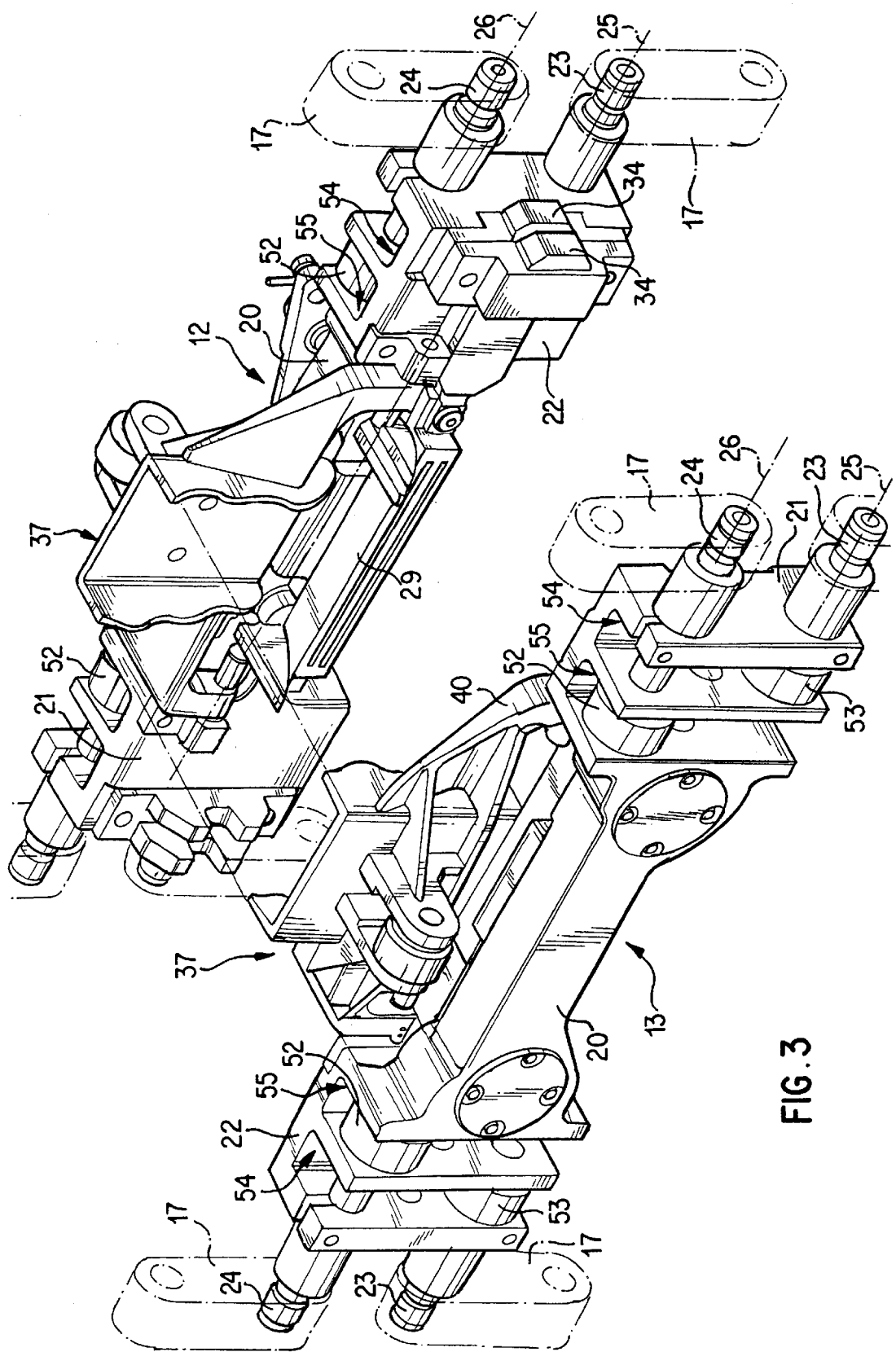
FIG. 3 shows a view in perspective of a jaw and corresponding counter-jaw of the FIG. 1 unit.

More specifically, and as shown in FIG. 3, jaws 12 and counter-jaws 13 each comprise a first pair of rollers 52, 53 fitted idly inside end projection 21 of main body 20, and a second pair of rollers 52, 53 fitted idly inside end projection 22 of main body 20; and projections 21, 22 each comprise a pair of parallel, side by side seats 54, 55 formed on the rear side (i.e. the side facing away from heating element 29 or pressure bar 35) and extending in a direction perpendicular to axes 25, 26 of pins 23, 24 and substantially parallel to the plane defined by axes 25, 26.

The roller 53 in each pair is housed inside a respective outer seat 54 (i.e. closer to the end of body 20) and fitted to a respective pin 23; and the roller 52 in each pair is housed inside a respective inner seat 55 and fitted to a respective pin 24.

Wall 6 (FIG. 1) is fitted with two pairs of cams 50, 51 cooperating with respective pairs of rollers 52, 53 of jaws 12; and, similarly, wall 7 is fitted with two pairs of cams 50, 51 cooperating with respective pairs of rollers 52, 53 of counter-jaws 13.

Cams 50, 51 comprise respective substantially U-shaped portions 50a, 51a extending about the top edge of respective walls 6, 7 to define, for respective chains 15, 27 of conveyors 10, 11, a transmission opposite respective drive wheels 16 and 28; and respective portions 50b, 51b extending along respective walls 6, 7, inside opening 8. Portions 50a, 51a define path portions P1, Q1 along which jaws 12 and counter-jaws 13 approach and contact tube 14 of packaging material; and portions 50b, 51b define facing, substantially parallel work portions P2, Q2 of paths P, Q, along which jaws 12 and counter-jaws 13 are maintained contacting under pressure to perform said sealing operations on tube 14 and so convert tube 14 into a continuous strip of packages 2 connected to one another by flat sealing bands 88 extending crosswise to tube 14, and which are eventually cut at a follow-up station of unit 1 not forming part of the present invention and therefore not described in detail.

Cams 50, 51 release respective chains 15, 27 at respective portions P3, Q3 of paths P and Q downstream from respective drive wheels 16, 28.

Along portions P3, Q3, chains 15, 27 cooperate with respective pairs of tensioners 56 for so tensioning the chains as to ensure rollers 52, 53 of jaws 12 and counter-jaws 13 are maintained contacting relative cams 50, 51.

Each tensioner 56 comprises a movable shoe 57 hinged about a horizontal axis to a support fixed to wall 6 or 7; and a spring 59 interposed between shoe 57 and wall 6 or 7. On the face facing away from wall 6 or 7, shoe 57 comprises two side by side rolling tracks 60, 61, which, by virtue of spring 59, cooperate respectively with rollers 52 and 53 of jaws 12 or counter-jaws 13.

With particular reference to FIGS. 4 to 7, pressure bar 35 of each counter-jaw 13 is so fitted to main body 20 as to be allowed a limited amount of movement in a lateral direction X perpendicular to the plane defined by axes 25, 26 of pins 23, 24, and which defines, in use, the direction in which pressure is applied by each jaw/counter-jaw pair on tube 14.

More specifically, bar 35 is fitted integrally in projecting manner with two pins 65 having respective axes parallel to direction X, and loosely engaging respective locating holes 66 formed in main body 20. In the example shown, pins 65 are screwed to the rear of bar 35, at opposite ends of front surface 46 of the bar.

Bar 35 is fitted to main body 20 via the interposition of two elastic connecting assemblies 67 for generating, in use, a reaction pressure in direction X to keep bar 35 against respective jaw 12.

Figure 6:
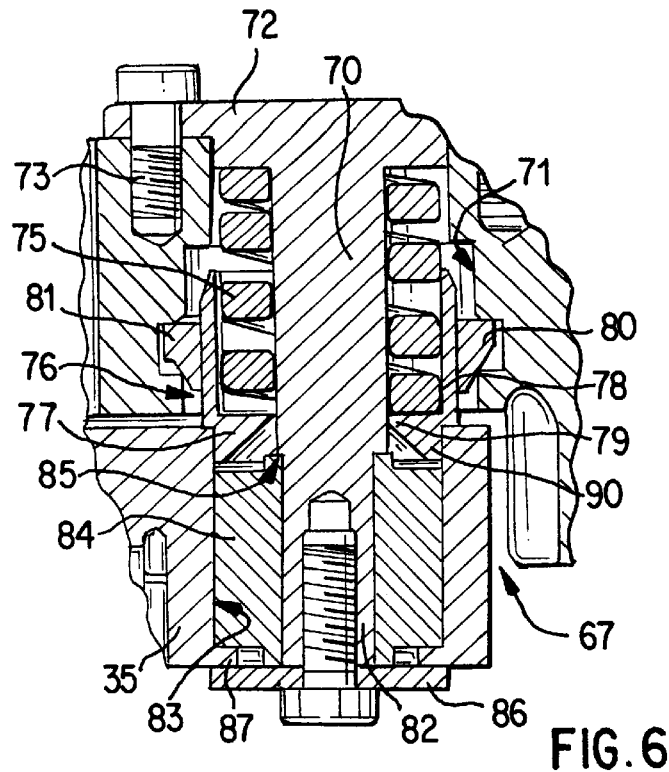
FIG. 6 shows a larger-scale detail of FIG. 5.
Figure 7:
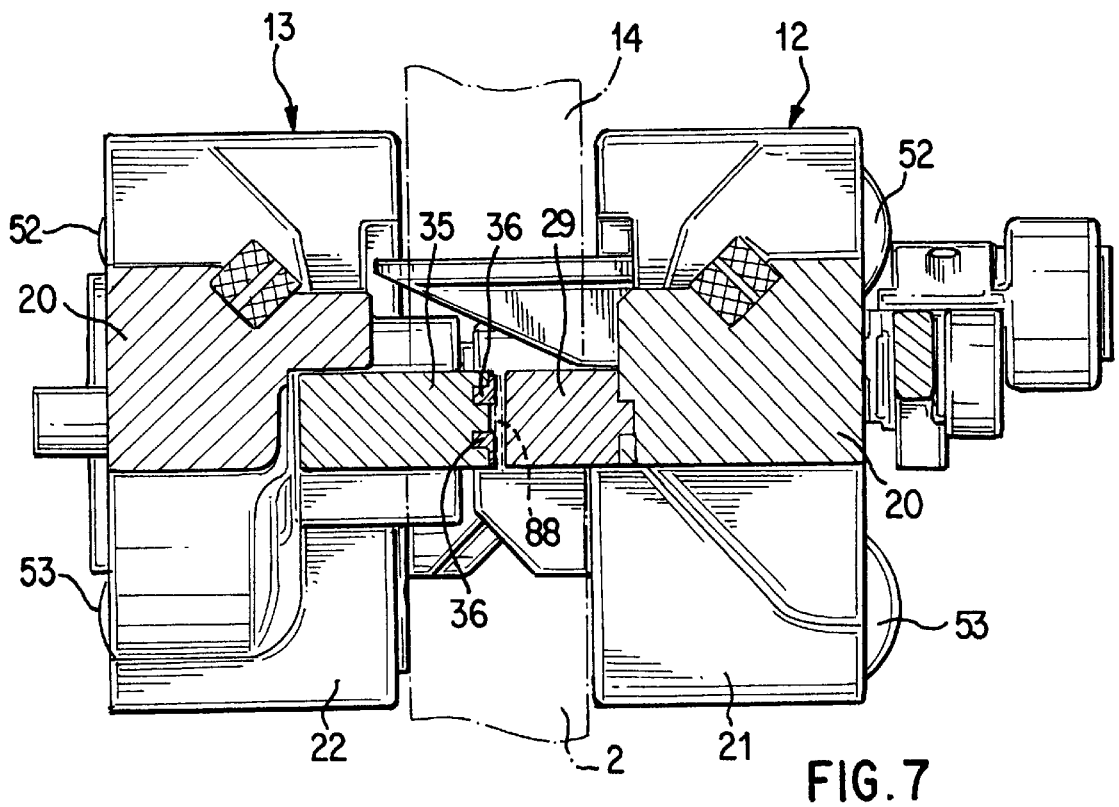
FIG. 7 shows a half cross section, with parts removed for clarity, of the FIG. 3 jaw and counter-jaw in the gripping position.

Assemblies 67 are located at opposite ends of bar 35, alongside front surface 46, and a larger-scale section of one of assemblies 67 is shown in FIG. 6, to which reference is made below.

Each assembly 67 substantially comprises a guide shaft 70 having an axis parallel to direction X, and which is fitted with ample radial slack through a substantially cylindrical through cavity 71 in main body 20, and comprises an end flange 72 fitted to the rear of body 20 by a number of screws 73 about cavity 71.

Cavity 71 houses a highly rigid coil spring 75 made of quadrangular-section wire and compressed between flange 72 and a cup-shaped element 76 slidable axially and loosely inside cavity 71 and connected axially and radially to bar 35. More specifically, element 76 comprises an annular base wall 77 cooperating axially with spring 75, and a cylindrical wall 78 housed loosely inside cavity 71; and wall 77 comprises a tapered inner knife edge 79 cooperating in sliding manner with shaft 70.

Cavity 71 comprises a circumferential groove 80 housing an annular seal 81, which cooperates in sliding manner with cylindrical wall 78 of element 76; and cavity 71 and element 76 are conveniently filled with lubricating grease.

A smaller-diameter end portion 82 of shaft 70 is housed inside a cylindrical seat 83 of pressure bar 35 via the interposition of a bush 84 of elastomeric material.

Bush 84 is packed between a shoulder 85 of shaft 70 and a stop washer 86 coaxial with shaft 70 and fitted to the end of end portion 82 of the shaft. The peripheral edge of washer 86 cooperates axially with an annular shoulder 87 of seat 83 of bar 35 to grip shoulder 87 axially against bush 84 and hold bar 35 against element 76 in opposition to spring 75. More specifically, base wall 77 of element 76 defines a locating collar 90 engaging seat 83 of pressure bar 35.

In actual use, therefore, along portion Q2 of path Q and by virtue of springs 75, bar 35 of each counter-jaw 13 is shifted laterally in direction X with respect to body 20 to compensate for the reduction in the thickness of the packaging material of tube 14 in the sealing region, due to softening of the packaging material by the heat generated by heating element 29 of corresponding jaw 12.

Figure 8:
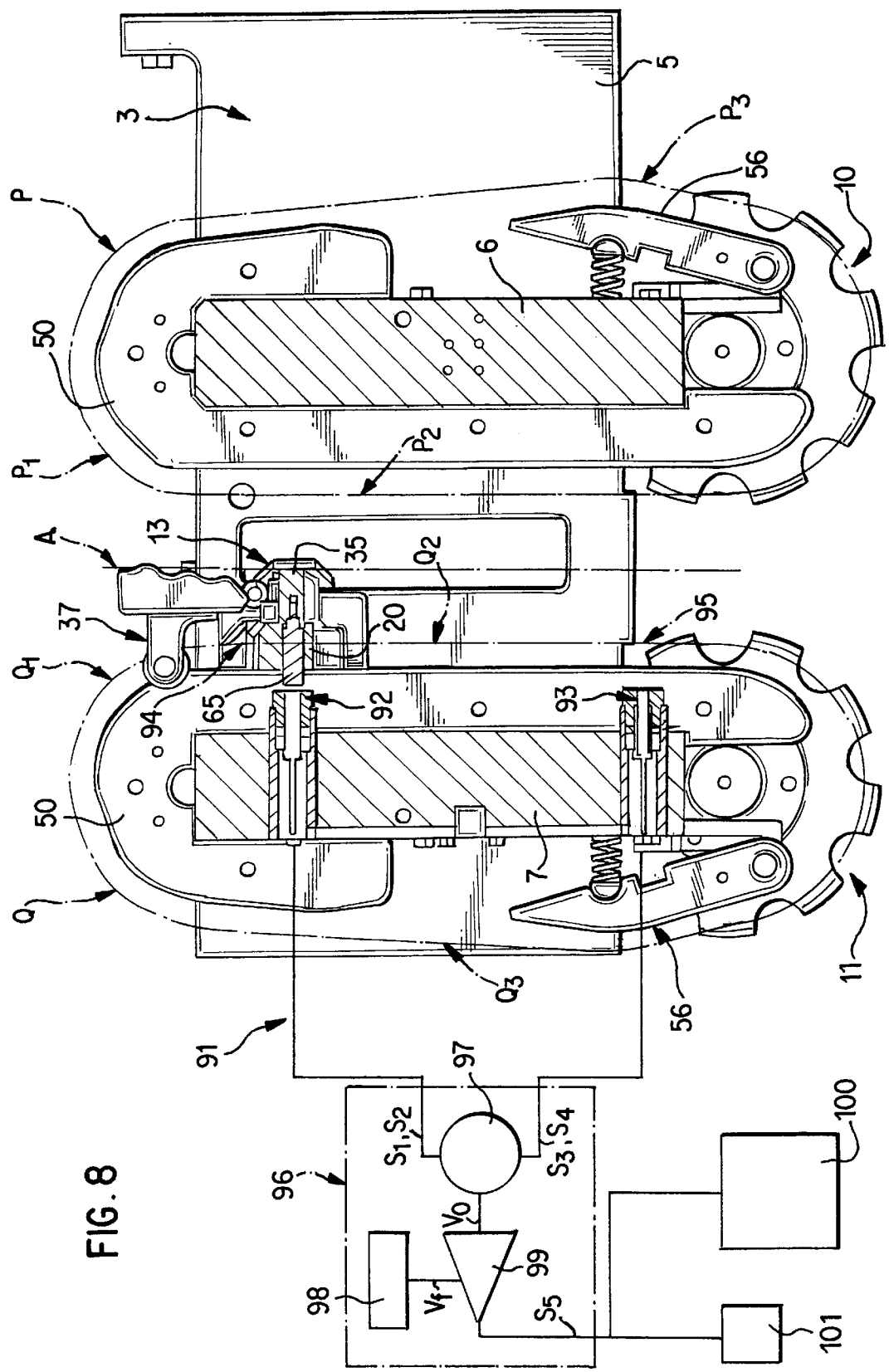
FIGS. 8 and 9 show partially sectioned side views, with parts removed for clarity, of the FIG. 1 unit at two different points in the work cycle.
Figure 9:
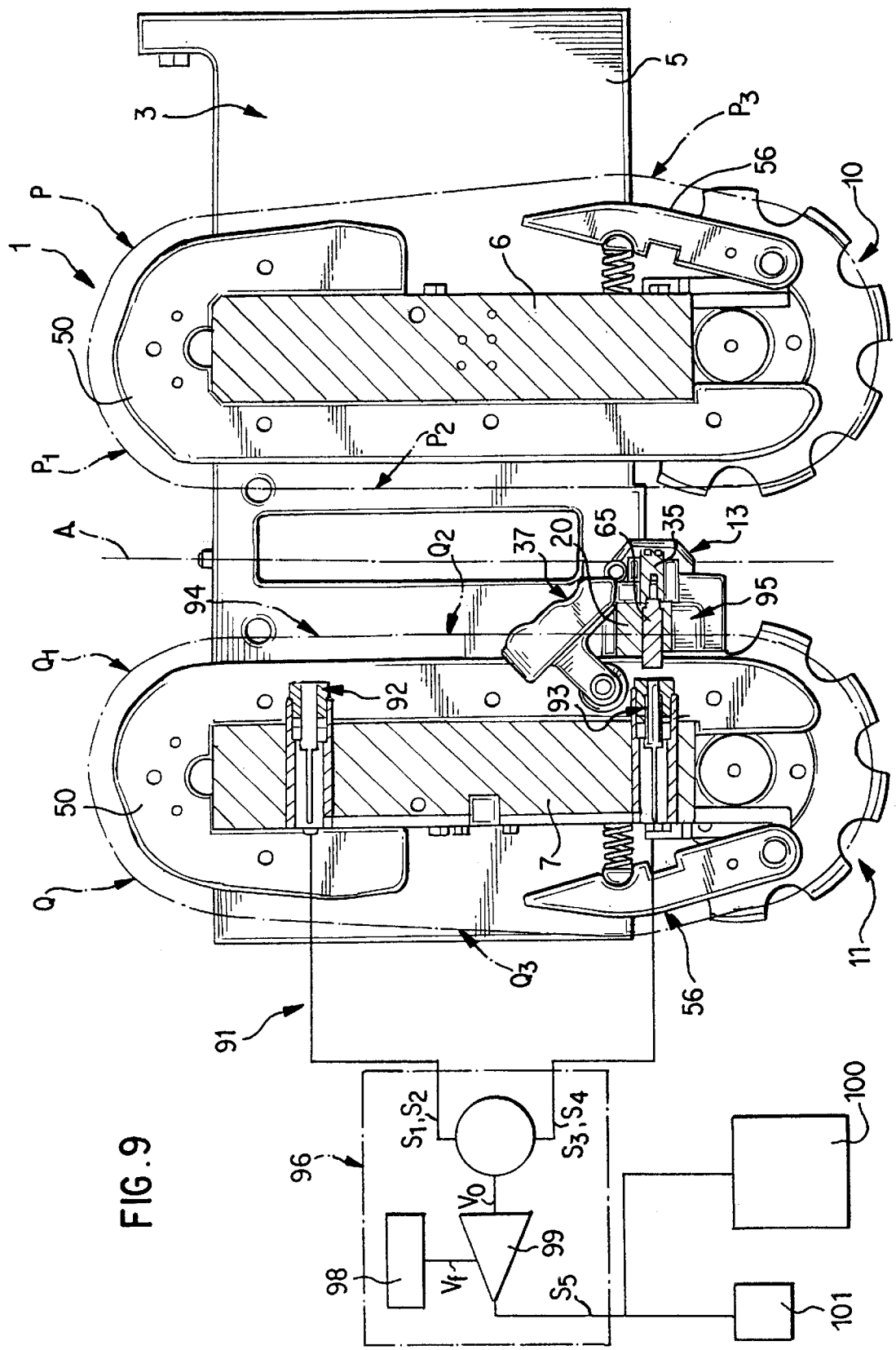

With reference to FIGS. 8 and 9, unit 1 also comprises a device 91 for monitoring the sealing of tube 14, and in turn comprising two pairs of sensors 92, 93 fitted to wall 7 at opposite ends 94, 95 of work portion Q2 of path P—respectively upstream and downstream from the portion of portion Q2 along which the sealing operations are performed—and which cooperate with each counter-jaw 13 to generate respective monitoring signals S1, S2, S3, S4 related to an operating value Vo of the total lateral shift of bar 35 of counter-jaw 13 in direction X and with respect to body 20 along portion Q2.

More specifically, sensors 92, aligned with each other in a direction perpendicular to direction X and to portion Q2 of path Q, are fitted to wall 7 at top end 94 of portion Q2, are located adjacent to respective side walls 4, 5, and generate monitoring signals S1, S2 related to the respective distances, in direction X, between sensors 92 and the pins 65 on bar 35 of the monitored counter-jaw 13.

Similarly, sensors 93, aligned with respective sensors 92 in a direction parallel to portion Q2 of path Q, are fitted to wall 7 at bottom end 95 of portion Q2, are located adjacent to respective side walls 4, 5, and generate monitoring signals S3, S4 related to the respective distances, in direction X, between sensors 93 and the pins 65 of the monitored counter-jaw 13.

Monitoring device 91 also comprises a processing unit 96 connected to sensors 92, 93, and which provides for comparing operating value Vo with a range I of reference lateral shift values Vf ranging between two limit values and representing normal operation of counter-jaw 13, and for generating a fault signal S5 indicating malfunctioning of the monitored counter-jaw 13, in the event value Vo fails to fall within range I of reference values Vf.

More specifically, processing unit 96 substantially comprises a calculating circuit 97 receiving monitoring signals S1, S2, S3, S4 and generating operating value Vo; a memory 98 in which reference values Vf are stored; and a comparing circuit 99 input-connected to calculating circuit 97 and to memory 98, and for reading the reference values Vf stored in memory 98 and comparing them with operating value Vo.

Calculating circuit 97 provides for determining the mean value m1 of the instantaneous values of monitoring signals S1, S2 as a counter-jaw 13 travels past sensors 92, and the mean value m2 of the instantaneous values of monitoring signals S3, S4 as the counter-jaw 13 travels past sensors 93; which values m1, m2 respectively represent the distances, in direction X, between bar 35 of the monitored counter-jaw 13 and respective pairs of sensors 92, 93.

Calculating circuit 97 also provides for calculating the difference between values m1 and m2 to generate operating value Vo of the total lateral shift, in direction X, of bar 35 of the monitored counter-jaw 13 with respect to sensors 92, 93 along portion Q2. Value Vo is obviously related to the total lateral shift, in direction X and along portion Q2 of path Q, of bar 35 of each counter-jaw 13 both with respect to respective body 20, and with respect to the corresponding jaw 12, which comprises no parts moving in direction X with respect to portion P2 of path P.

Value Vo therefore indicates the degree to which tube 14 is compressed during sealing, and provides, indirectly, for determining the quality of the seal.

Finally, fault signal S5 is supplied simultaneously to a control unit 100 for controlling the operating cycle of unit 1 and arresting conveyors 10, 11, and to a signalling device 101, e.g. a display or alarm.

Unit 1 operates as follows.

Figure 2:
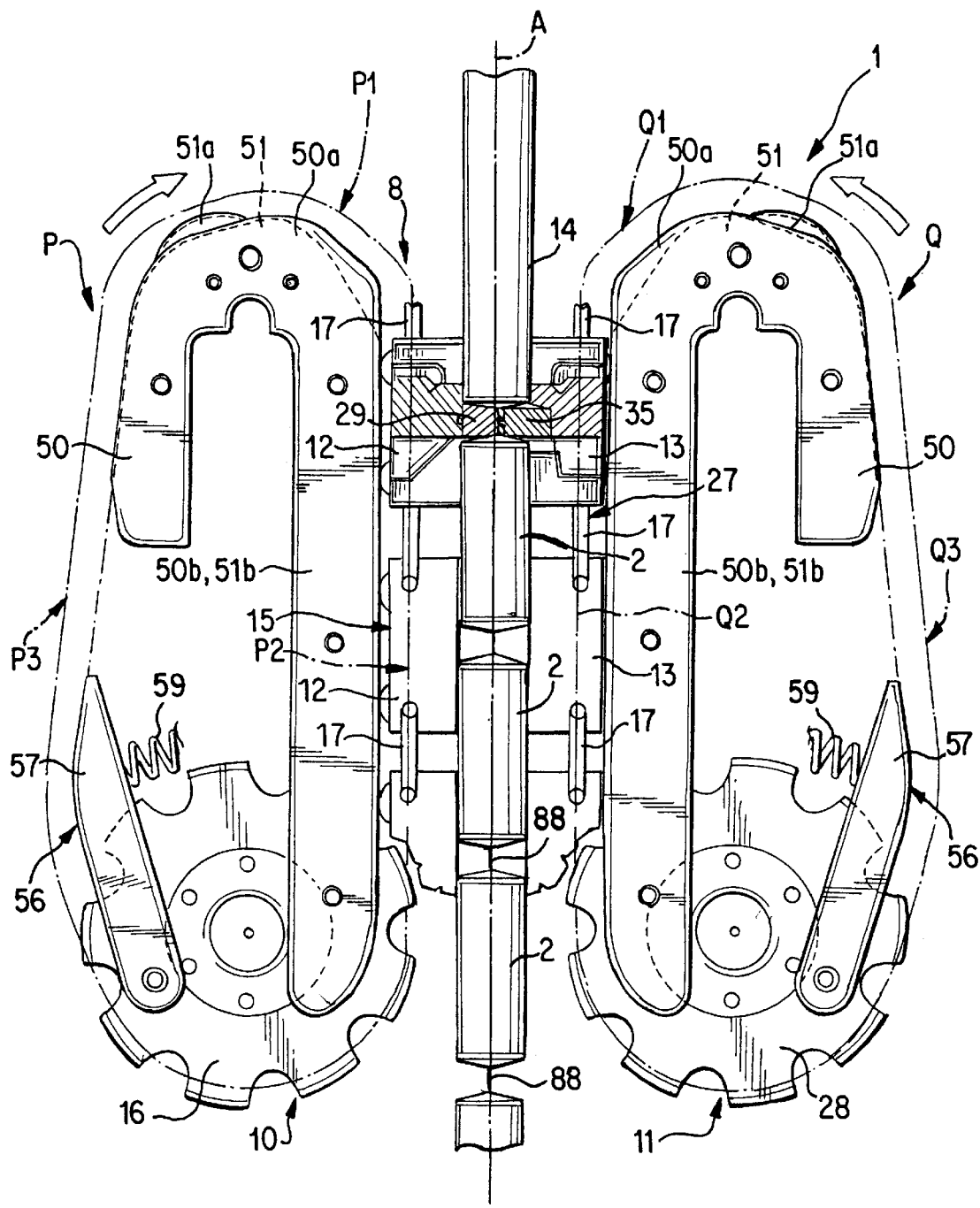
FIG. 2 shows a schematic side view, with parts removed for clarity, of the FIG. 1 unit.

Conveyors 10, 11 are rotated in known manner in opposite directions, as indicated by the arrows in FIG. 2, so that, from the end of portions P1, Q1 of respective paths P, Q and along respective portions P2, Q2, respective jaws 12 and counter-jaws 13 cooperate with tube 14 of packaging material according to a movement defined by the profiles of cams 50, 51.

After a first stage wherein tube 14 is contacted and gradually compressed, and the packaging material is folded locally to form a flat sealing band 88, jaws 12 and counter-jaws 13 reach respective straight portions 50b, 51b of cams 50, 51 (FIG. 2) where maximum gripping pressure is applied to tube 14 and heating element 29 of each jaw 12 is supplied to perform the sealing operation by heat-sealing the packaging material.

The distance between portions 50b and between portions 51b of respective substantially homologous cams 50, 51 of jaws 12 and counter-jaws 13 is constant along the greater part of said portions, and is so selected as to slightly compress and deform springs 75 of counter-jaws 13.

Such compression is made possible by the axial elastic rigidity of bushes 84 of elastomeric material being considerably less than that of springs 75, so that, when bar 35 cooperates with heating element 29 of the corresponding jaw 12 to grip the packaging material, the pressure to which bar 35 is subjected in gripping direction X axially compresses bushes 84, and is almost entirely transmitted to springs 75 via respective cup-shaped elements 76.

As springs 75 are only deformed to a very small extent, the gripping pressure exerted on the packaging material is substantially determined by the preload of springs 75.

At the sealing stage, the heat generated by heating element 29 of each jaw 12 softens and so reduces the thickness of respective sealing band 88, and springs 75 of the corresponding counter-jaw 13 laterally shift bar 35 in direction X towards heating element 29 to maintain a constant pressure on tube 14.

As described, monitoring device 91 provides for determining whether the operating value Vo of the lateral shift in direction X of bar 35 of each counter-jaw 13 along portion Q2 falls within or outside range I of reference lateral shift values Vf.

An operating value Vo outside range I indicates abnormal sealing pressure on tube 14, e.g. due to malfunctioning of springs 75, in which case, the operator is informed immediately by signalling device 101, and unit 1 is stopped for repair.

According to a variation not shown, the two pairs of sensors 92, 93 may be replaced by one or more temperature sensors fitted to wall 7 of frame 3, located along work portion Q2 of path Q, and for determining the temperature of counter-jaws 13 and comparing it, like sensors 92, 93, with a predetermined range of reference values indicating normal operation of counter-jaws 13.

The advantages of unit 1 according to the present invention will be clear from the foregoing description.

In particular, monitoring device 91 is easy to produce and highly reliable, by featuring fixed sensors (92, 93) fitted integrally to frame 3 of unit 1, and which provide for determining the shift in direction X of pressure bar 35 of each counter-jaw 13 with respect to respective body 20, and therefore with respect to the corresponding jaw 12. As said shift indirectly indicates the sealing pressure exerted on tube 14, the monitoring signals S1, S2, S3, S4 supplied by sensors 92, 93 may be processed to determine conformance of the sealing quality of packages 2 with a predetermined standard.

Moreover, the monitoring system described solves the problem of transferring monitoring signals from moving members.

Clearly, changes may be made to unit 1 as described and illustrated herein without, however, departing from the scope of the claims.

In particular, the two pairs of position sensors 92, 93 may be replaced by two single position sensors respectively located at opposite ends 94, 95 of work portion Q2 of path Q, in which case, calculating circuit is simplified by no longer having to determine values m1 and m2.

Moreover, provision may be made for only one position sensor, of the same type as sensors 92, 93, located at a predetermined significant point along work portion Q2 of path Q, and for determining the distance, direction X, between itself and bar 35 of each counter-jaw 13, and comparing said distance with a predetermined reference distance value.

What is claimed is:

1. A packaging unit for continuously producing sealed packages, containing a pourable food product, from a tube made of heat-seal packaging material in sheet form, fed along a vertical supply path and filled with said food product, said unit comprising:

a first chain conveyor having a plurality of first jaws and defining a first endless path of said first jaws;

a second chain conveyor having a plurality of laterally shiftable second jaws and defining a second endless path of said second jaws;

said first path and said second path respectively comprising a first work portion and a second work portion adjacent to said tube supply path extending substantially symmetrically on opposite sides of said supply path, so that said first jaws are maintained contacting respective said second jaws to grip said tube at respective equally spaced cross sections, and to perform, at said cross sections, respective sealing operations on the tube by heat-sealing the packaging material;

monitoring means for monitoring at least said second jaws along said second work portion of said second path, to determine correct performance of said sealing operations, said monitoring means comprising fixed sensor means located at said second work portion and cooperating with each said second jaw to generate at least one monitoring signal related to an operating value of a quantity associated with said second jaw, and comparing means for comparing said operating value with at least one predetermined reference value of said quantity, and for generating a fault signal in the event of a predetermined relationship between said operating value and said reference value;

wherein said fixed sensor means comprises:

at least one first fixed sensor positioned at a first position along said second work portion, and at least one second fixed sensor located at a second position along said second work portion, said second position being spaced from said first position along said second work portion;

said first fixed sensor and said second fixed sensor cooperating with said second jaw to generate at least two distinct monitoring signals related to an operating value of said quantity; and means for comparing said operating value related to said at least two distinct monitoring signals with a range of lateral shift values indicative of normal operation.

2. A unit according to claim 1, wherein said quantity is the temperature of said second jaws, and at least one of said at least one first fixed sensor and said at least one second fixed sensor comprises at least one temperature sensor located in a predetermined fixed position along said second work portion of said second path.

3. A unit according to claim 1, wherein said second jaws each comprise:
  a main body defining a link of said second chain conveyor;
  a pressure element fitted to said main body and movable with respect to the main body in a lateral direction crosswise relative to said supply path to exert a gripping pressure on said packaging material in opposition to a corresponding first jaw; and
  elastic means interposed between said main body and said pressure element and defining said gripping pressure;
  said sensor means comprising at least one position sensor located in a predetermined fixed position along said second work portion and cooperating with each said second jaw to generate said monitoring signal related to the distance, in said lateral direction, between said pressure element of said second jaw and the position sensor.

4. A packaging unit for continuously producing sealed packages, containing a pourable food product, from a tube made of heat-seal packaging material in sheet form, fed along a vertical supply path and filled with said food product, said unit comprising:
  a first chain conveyor having a plurality of first jaws and defining a first endless path of said first jaws;
  a second chain conveyor having a plurality of second jaws and defining a second endless path of said second jaws;
  said first path and said second path respectively comprising a first work portion and a second work portion adjacent to said tube supply path extending substantially symmetrically on opposite sides of said supply path, so that said first jaws are maintained contacting respective said second jaws to grip said tube at respective equally spaced cross sections, and to perform, at said cross sections, respective sealing operations on the tube by heat-sealing the packaging material;
  monitoring means for monitoring at least said second jaws along said second work portion of said second path, to determine correct performance of said sealing operations, said monitoring means comprising fixed sensor means located at said second work portion and cooperating with each said second jaw to generate at least one monitoring signal related to an operating value of a quantity associated with said second jaw, and comparing means for comparing said operating value with at least one predetermined reference value of said quantity, and for generating a fault signal in the event of a predetermined relationship between said operating value and said reference value;

wherein said second jaws each comprise:
  a main body defining a link of said second chain conveyor;
  a pressure element fitted to said main body and movable with respect to the main body in a lateral direction crosswise relative to said supply path to exert a gripping pressure on said packaging material in opposition to a corresponding first jaw; and
  elastic means interposed between said main body and said pressure element and defining said gripping pressure, said sensor means comprising at least one position sensor located in a predetermined fixed position along said second work portion and cooperating with each said second jaw to generate said monitoring signal related to the distance, in said lateral direction, between said pressure element of said second jaw and the position sensor;

wherein said quantity associated with said second jaw is the total lateral shift of said pressure element of each second jaw in said lateral direction, along said second work portion and with respect to said sensor means;

said sensor means comprising at least two position sensors located at opposite ends of said second work portion respectively upstream and downstream from a portion of said second work portion in which said sealing operations are performed, and cooperating with each said second jaw to generate said monitoring signals related to respective distances, in said lateral direction, between said pressure element of the second jaw and each of said position sensors;

further comprising calculating means interposed between said position sensors and said comparing means, and which receive said monitoring signals and generate said operating value as the difference between values assumed by said monitoring signals at predetermined instants in time.

5. A unit according to claim 4, wherein said predetermined instants in time are defined respectively by the instant in which each said second jaw travels past one of said position sensors and by the instant in which the second jaw travels past the other of said position sensors.

6. A unit according to claim 1, wherein said comparing means generates said fault signal in the event said operating value is outside a range of said reference values ranging between two limit values and indicating correct operation of said second jaws.

7. A method of monitoring a sealing operation on a packaging unit for continuously producing sealed packages, containing a pourable food product, from a tube of packaging material fed along a vertical supply path and filled with said food product, said unit comprising:
  a first chain conveyor having a plurality of first jaws and defining a first endless path of said first jaws;
  a second chain conveyor having a plurality of laterally shiftable second jaws and defining a second endless path of said second jaws;
  said first path and said second path respectively comprising a first work portion and a second work portion adjacent to said tube supply path extending substantially symmetrically on opposite sides of said supply path, so that said first jaws are maintained contacting respective said second jaws to grip said tube at respective equally spaced cross sections, and to perform, at said cross sections, respective sealing operations on the tube by heat-sealing the packaging material;

wherein said fixed sensor means comprises:
   at least one first fixed sensor positioned at a first position along said second work portion, and
   at least one second fixed sensor located at a second position along said second work portion, said second position being spaced from said first position along said second work portion:
said first fixed sensor and said second fixed sensor capable of cooperating with said second jaw to generate at least two distinct monitoring signals related to an operating value of said quantity: and
means for comparing said operating value related to said at least two distinct monitoring signals with a range of lateral shift values indicative of normal operation;
said method comprising the steps of:
   generating, by means of said fixed sensor means at least two distinct monitoring signals relative to each said second jaw and related to an operating value of a quantity associated with the second jaw;
   comparing said operating value with a range of lateral shift values indicative of normal operation; and
   generating a fault signal in the event of a predetermined relationship between said operating value and said range of lateral shift values.

8. A method according to claim 7, wherein said quantity is the temperature of said second jaws.

9. A method according to claim 7, wherein said second jaws each comprise a main body defining a link of said second chain conveyor; a pressure element fitted to said main body and movable with respect to the main body in a lateral direction crosswise to said supply path to exert a gripping pressure on said packaging material in opposition to a corresponding said first jaw; and elastic means interposed between said main body and said pressure element, and defining said gripping pressure;
   wherein said step of generating said first monitoring signal comprises generating a signal by at least one position sensor of said sensor means which is related to the distance, in said lateral direction, between said pressure element of each said second jaw and said position sensor.

10. A method of monitoring a sealing operation on a packaging unit for continuously producing sealed packages, containing a pourable food product, from a tube of packaging material fed along a vertical supply path and filled with said food product, said unit comprising:
   a first chain conveyor having a plurality of first jaws and defining a first endless path of said first jaws;
   a second chain conveyor having a plurality of second jaws and defining a second endless path of said second jaws;
   said first path and said second path respectively comprising a first work portion and a second work portion adjacent to said tube supply path extending substantially symmetrically on opposite sides of said supply path, so that said first jaws are maintained contacting respective said second jaws to grip said tube at respective equally spaced cross sections, and to perform, at said cross sections, respective sealing operations on the tube by heat-sealing the packaging material;
said method comprising the steps of:
   generating, by means of fixed sensor means located at said second work portion, at least a first monitoring signal relative to each said second jaw and related to an operating value of a quantity associated with the second jaw;
   comparing said operating value with at least one predetermined reference value of said quantity; and
   generating a fault signal in the event of a predetermined relationship between said operating value and said reference value;
   wherein said second jaws each comprise a main body defining a link of said second chain conveyor; a pressure element fitted to said main body and movable with respect to the main body in a lateral direction crosswise to said supply path to exert a gripping pressure on said packaging material in opposition to a corresponding said first jaw; and elastic means interposed between said main body and said pressure element, and defining said gripping pressure;
   wherein said step of generating said first monitoring signal comprises generating a signal by at least one position sensor of said sensor means which is related to the distance, in said lateral direction, between said pressure element of each said second jaw and said position sensor;
   wherein said quantity is the total lateral shift of said pressure element of each second jaw in said lateral direction, along said second work portion and with respect to said sensor means, said sensor means comprising two position sensors located at opposite ends of said second work portion respectively upstream and downstream from a portion of said second work portion in which said sealing operations are performed, said first monitoring signal being generated by a first of said position sensors; and said method further comprising the steps of:
      generating, by means of a second of said position sensors, a second monitoring signal related to the distance, in said lateral direction, between said pressure element of each said second jaw and said second position sensor; and
      calculating said operating value as the difference between values assumed by said first and said second monitoring signal at predetermined instants in time.

11. A method according to claim 10, wherein said predetermined instants in time are defined respectively by the instant in which each said second jaw travels past said first position sensor and by the instant in which the second jaw travels past said second position sensor.

12. A method according to claim 7, wherein said fault signal is generated in the event said operating value is outside a range of said reference values ranging between two limit values and indicating correct operation of said second jaws.

* * * * *